United States Patent [19]

Gass

[11] Patent Number: 4,480,198

[45] Date of Patent: Oct. 30, 1984

[54] DEVICE FOR INCREASING THE OPERATIONAL SECURITY OF A DUPLICATED CLOCK

[75] Inventor: Raymond Gass, Bolsenheim, France

[73] Assignee: La Telephonie Industrielle et Commerciale Telic Alcatel, Strasbourg, France

[21] Appl. No.: 380,313

[22] Filed: May 20, 1982

[30] Foreign Application Priority Data

May 20, 1981 [FR] France ............................ 81 10022

[51] Int. Cl.³ ...................... H03K 3/00; H03K 19/003
[52] U.S. Cl. ............................... 307/269; 307/200 A; 307/219; 307/527; 328/72
[58] Field of Search ............... 307/219, 269, 234, 518, 307/526, 527, 200 A, 443; 328/103, 104, 105, 119, 153, 154, 72, 63, 62

[56] References Cited

U.S. PATENT DOCUMENTS 3,628,158 12/1971 Sjoquist ............................... 307/219
4,185,245 1/1980 Fellinger et al. .
4,229,701 10/1980 Bourner .............................. 307/518

FOREIGN PATENT DOCUMENTS 2315736 1/1977 France .

Primary Examiner—John Zazworsky
Attorney, Agent, or Firm—Sughrue, Mion, Zinn, Macpeak & Seas

[57] ABSTRACT

A device for increasing the operational security of a duplicated clock which comprises first and second clocks comprises in each clock a selector circuit with inputs connected to a filter and signal shaping circuit of each clock. Each selector circuit comprises two processing circuits and an output circuit which implements the following logic equation:

$$w = (q1 + \overline{q2}) \cdot w1 + (\overline{q1} + q2) \cdot w2$$

in which:
  w is a clock signal from the selector circuit,
  w1 and w2 are the reconstituted clock signals produced by the first and second clocks, respectively.
  q1 and $\overline{q1}$ are the direct and complemented output signals of the bistable of the first processing circuit, and
  q2 and $\overline{q2}$ are the direct and complemented output signals of the bistable of the second processing circuit.

3 Claims, 6 Drawing Figures

DEVICE FOR INCREASING THE OPERATIONAL SECURITY OF A DUPLICATED CLOCK

BACKGROUND OF THE INVENTION

1. Field of the invention

The invention concerns a device for increasing the operational security of a duplicated clock. A duplicated clock is used, for example, in telecommunication exchanges to control a peripheral. It comprises two clocks each of which generates timing signals required to control the units of the peripheral.

2. Description of the prior art

In the case of a telecommunication exchange, each clock is generally controlled by three high-reliability timebases, each of which outputs a clock signal and a synchronization signal. Each clock generally receives the three clock signals from the three timebases via a first majority logic circuit which produces a majority signal from which the clock generates the timing signals to be output to the peripheral, the majority clock signal also being usable within the peripheral to control certain units.

Each clock of a duplicated clock also receives, for example, the three synchronization signals from the three timebases via a second majority logic circuit which produces a majority synchronization signal which is recognized by the majority clock signal.

The majority clock signal is generally filtered and shaped by a filter and signal shaping circuit before it is used to generate the timing signals and for purposes of recognition of the majority synchronization signal.

One clock of a duplicated clock is connected to some units of the peripheral, the other clock being connected to other units of the same peripheral. Should one clock fail, the peripheral is rendered inoperative, irrespective of the level within the clock at which the failure has occurred. Moreover, the clock signals obtained at the output of the filter and signal shaping circuit of each clock may be out of phase. This phase difference also affects the timing signals produced by each clock, which may be prejudicial to correct operation of the peripheral and render it inoperative when the phase difference is of excessive magnitude.

The objective of the present invention is to increase the operational security of a duplicated clock and thereby to reduce the causes for failure of a peripheral, or more generally of the device to which it supplies timing signals.

SUMMARY OF THE INVENTION

The invention consists in a device for increasing the operational security of a duplicated clock which comprises identical first and second clocks, each of which includes a majority logic circuit receiving a respective clock signal from each of three timebases and generating a majority clock signal and a filter and signal shaping circuit receiving said majority clock signal and producing a reconstituted clock signal, said device comprising in each clock a selector circuit which includes identical first and second processing circuits and an output circuit which has a respective input connected to each of said processing circuits, each of which has a respective input connected to the filter and signal shaping circuit of each clock and each of which includes a bistable and logic gates, said bistable of said first processing circuit having a signal input connected to said filter and signal shaping circuit of said first clock and a clock input connected to said filter and signal shaping circuit of said second clock, and said bistable of said second processing circuit having a signal input connected to said first and signal shaping circuit of said second clock and a clock input connected to said filter and signal shaping circuit of said first clock, wherein said selector circuit implements the logic equation:

$$w = (q1 + \overline{q2}) \cdot w1 + (\overline{q1} + q2) \cdot w2$$

in which:

w is a clock signal from the selector circuit, w1 and w2 are the reconstituted clock signals produced by the first and second clocks, respectively, q1 and $\overline{q1}$ are the direct and complemented output signals of said bistable of said first processing circuit, and q2 and $\overline{q2}$ are the direct and complemented output signals of said bistable of said second processing circuit.

The invention will now be described with reference to the embodiments shown in the accompanying drawings.

DESCRIPTION OF THE PREFERRED EMBODIMENTS

Figure 1:
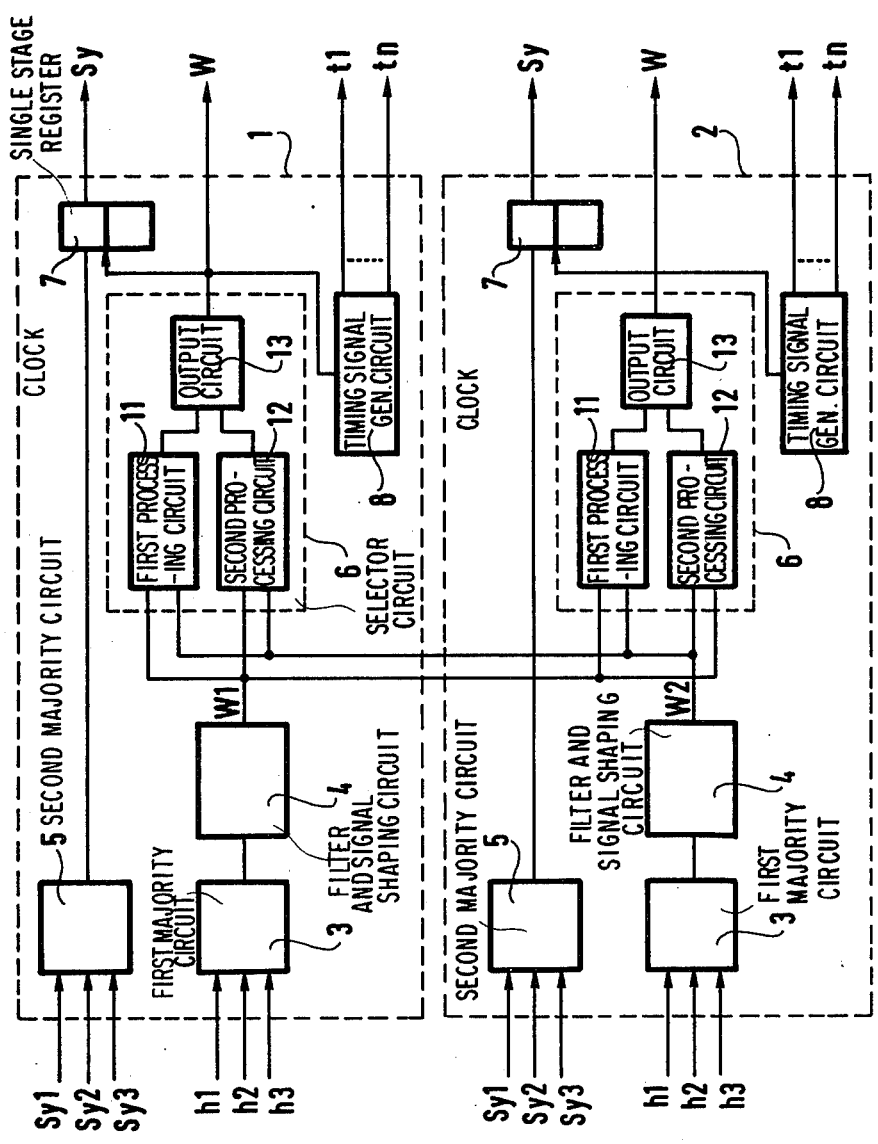
FIG. 1 is a block schematic of a duplicated clock incorporating the device in accordance with the invention.

FIG. 1 shows a duplicated clock comprising two clocks 1 and 2. Each clock comprises a first majority logic circuit 3 receiving clock signals, h1, h2, h3 from three timebases and a second majority logic circuit 5 receiving synchronization signals Sy1, Sy2, Sy3 from the three timebases. First majority logic circuit 3 outputs a majority clock signal to a filter and signal shaping circuit 4 which produces a reconstituted clock signal, w1 in the case of clock 1 and w2 in the case of clock 2. A selector circuit 6 in each clock receives reconstituted clock signals w1 and w2 and outputs a clock signal w.

A single-stage register 7 receives a majority synchronization signal from second majority logic circuit 5. It is controlled by clock signal w and outputs synchronization signal Sy.

A timing signal generator circuit 8 receives clock signal w, which it divides down to produce various timing signals t1 to tn.

Each selector circuit 6 comprises a first processing circuit 11, a second processing circuit 12 and an output circuit 13. The first and second processing circuits receive reconstituted clock signals w1 and w2. First processing circuit 11 is controlled by reconstituted clock signal w2 and second processing circuit 12 is controlled by reconstituted clock signal w1.

The device for increasing the operational security of the duplicated clock is therefore constituted by the two selector circuits 6, one in each clock.

Figure 2:
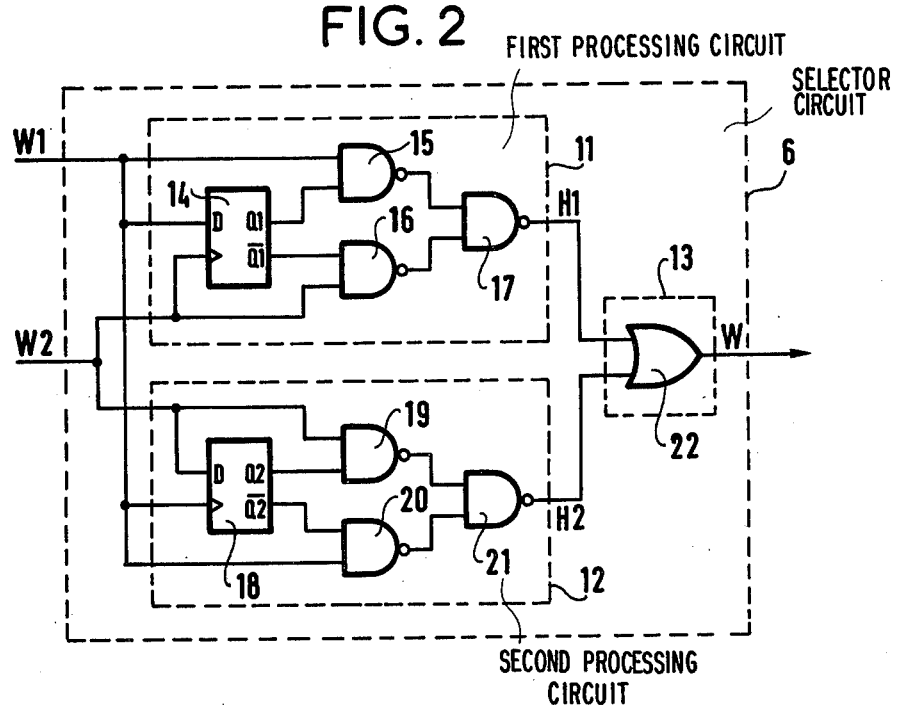
FIG. 2 is a block schematic of a device in accordance with the invention.

FIG. 2 shows a first embodiment of selector circuit 6 of FIG. 1. First processing circuit 11 comprises a bistable 14 a D flip-flop, for example, and three NAND gates 15, 16, 17. Bistable 14 receives reconstituted clock signal w1 on its signal input D and reconstituted clock signal w2 on its clock input. Its direct output Q1 is connected to an input of NAND gate 15, another input of which receives reconstituted clock signal w1. Its complemented output $\overline{Q1}$ is connected to an input of NAND gate 16 which receives on another input reconstituted clock signal w2. NAND gate 17 has one input connected to the output of NAND gate 15 and another input connected to the output of NAND gate 16.

Second processing circuit 12 is identical to first processing circuit 11. Thus it comprises a bistable 18 and three NAND gates 19, 20, 21. Bistable 18 receives reconstituted clock signal w2 on its signal input D and reconstituted clock signal w1 on its clock input. Its direct output Q2 is connected to an input of NAND gate 19, another input of which receives reconstituted clock signal w2. Its complemented output $\overline{Q2}$ is connected to an input of NAND gate 20 which receives on another input reconstituted clock signal w1. NAND gate 21 has an input connected to the output of NAND gate 19 and another input connected to the output of NAND gate 20.

Output circuit 13 comprises an OR gate 22 having an input connected to the output of NAND gate 17 of first processing circuit 11 and another input connected to the output of NAND gate 21 of second processing circuit 12. OR gate 22 outputs clock signal w.

If H1 designates the output signal of NAND gate 17, H2 the output signal of NAND gate 21, q1$\overline{q1}$ the signals on outputs Q1 and $\overline{Q1}$ of bistable 14, and q2, $\overline{q2}$ the signals on outputs Q2 and $\overline{Q2}$ of bistable 18, then the following logic equations apply:

$$H1 = q1 \cdot w1 + \overline{q1} \cdot w2 \qquad H2 = q2 \cdot w1 + \overline{q2} \cdot w1$$

$$w = H1 + H2$$

$$w = (q1 + \overline{q2}) \cdot w1 + (\overline{q1} + q2)w2 \qquad (1)$$

Figure 3:
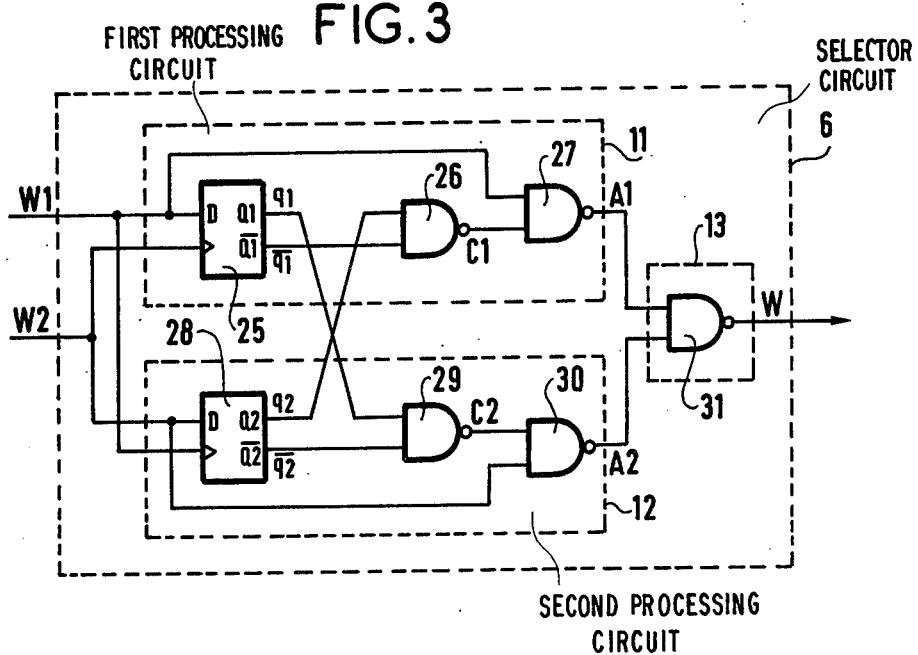
FIG. 3 is a block schematic of an alternative embodiment of the device in accordance with the invention.

FIG. 3 shows a second embodiment of selector circuit 6 of FIG. 1. First processing circuit 11 comprises a bistable 25, of type D, for example, and two NAND gates 26, 27. Second processing circuit 12 is identical to first processing circuit 11 and comprises a bistable 28 and two NAND gates 29, 30. Output circuit 13 consists of a NAND gate 31. Bistable 25 receives reconstituted clock signal w1 on its signal input D and reconstituted clock signal w2 on its clock input. Its output Q1 is connected to an input of NAND gate 29 of the second processing circuit and its output $\overline{Q1}$ is connected to an input of NAND gate 26. Bistable 28 receives reconstituted clock signal w2 on its signal input D and reconstituted clock signal w1 on its clock input. Its output Q2 is connected to an input of NAND gate 26 of first processing circuit 11 and its output $\overline{Q2}$ is connected to an input of NAND gate 29. The output of NAND gate 26 is connected to an input of NAND gate 27, another input of which receives reconstituted clock signal w1. The output of NAND gate 29 is connected to an input of NAND gate 30, another input of which receives reconstituted clock signal w2. NAND gate 31 of output circuit 13 has an input connected to the output of NAND gate 27 and another input connected to the output of NAND gate 30. Its output produces clock signal w.

If A1 and A2 designate the signals at the outputs of NAND gates 27 and 30, C1 and C2 the signals at the outputs of NAND gates 26 and 29, q1, $\overline{q1}$ the signals on outputs Q1 and $\overline{Q1}$ of bistable 25, and q2, $\overline{q2}$ the signals on outputs Q2 and $\overline{Q2}$ of bistable 28, then the following logic equations apply:

$$w = \overline{A1 \cdot A2} = \overline{A1} + \overline{A2}$$

$$\overline{A1} = C1 \cdot w1 \qquad \overline{A2} = C2 \cdot w2$$

$$C1 = q1 + \overline{q2} \qquad C2 = \overline{q1} + q2$$

$$w = (q1 + \overline{q2})w1 + (\overline{q1} + q2)w2 \qquad (2)$$

Logic equations (1) and (2) are identical, demonstrating that the circuits of FIGS. 2 and 3 are equivalent.

Attention will now be given to the operation of the selector circuit of FIG. 3 in the various operating circumstances which may arise in respect of reconstituted clock signals w1 and w2.

Figure 4:
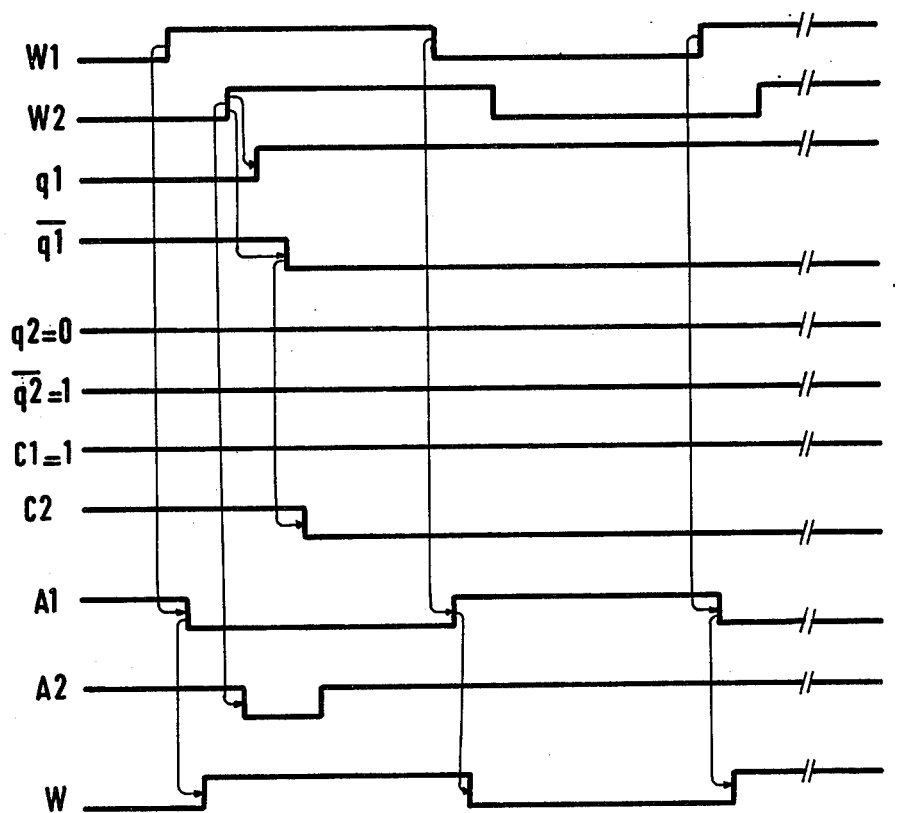
FIGS. 4, 5 and 6 are timing diagrams showing the signals at various points in the selector circuit for three operating conditions.

1. w1 and w2 are present and w1 is leading w2. FIG. 4 is a timing diagram showing the various signals in the selector circuit. As soon as the duplicated clock and therefore the selector circuit is powered up, since w1 and w2 have the value 0: q1=0, q2=0, $\overline{q1}$=1, $\overline{q2}$=1, C1=1, C2=1, A1=1, A2=1 and w=0. When w1 goes to 1, then A1=0 and w=1, the other selector circuit signals not changing state. When w2 goes to 1 then q1=1, $\overline{q1}$=0 and A2=0. As C2 goes to 0 when q1 goes to 1, however, which occurs with a slight delay relative to w2, A2 resumes the value 1.

With reconstituted clock signals w1 and w2 established and w1 leading w2, the various signals in the selector circuit no longer change state, except A1 which assumes the value 1 when w1 goes to 0 and the value 0 when w1 goes to 1. Clock signal w is thus alternately at 0 and at 1, changing state at a rate set by w1.

2. w1 leads w2 and fails.

Figure 5:
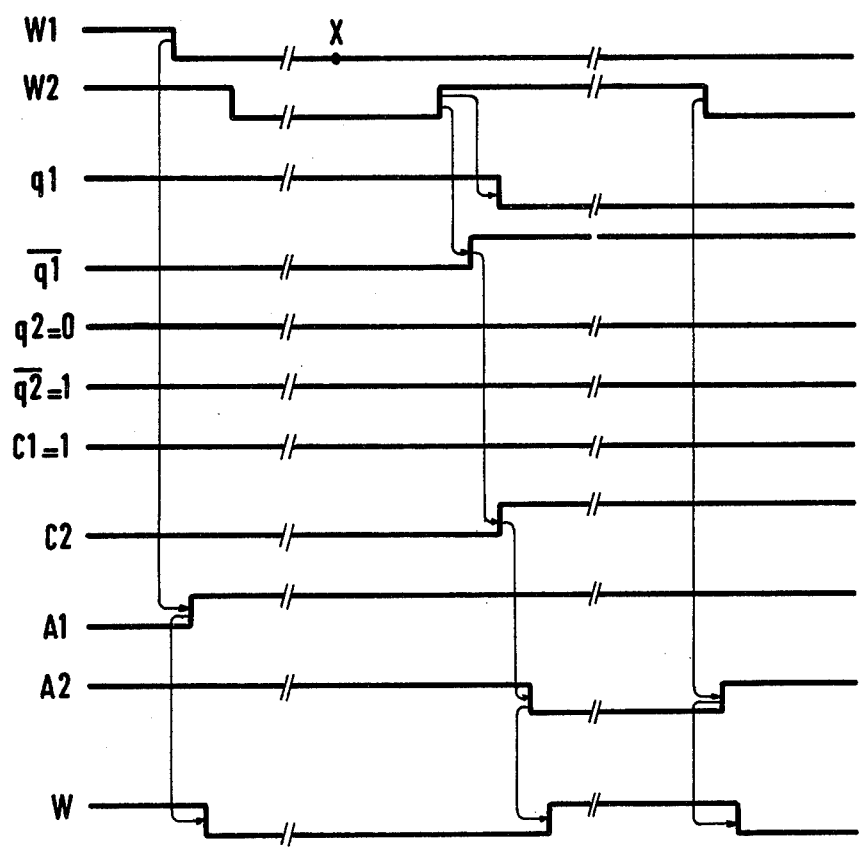

FIG. 5 is a timing diagram showing the various signals in the selector circuit, the X indicating failure of w1.

Until failure occurs the signals have the value shown in FIG. 4, under steady state conditions.

When wi fails, it goes to the value 0 and consequently A1 remains at the value 1. As soon as the first change from value 0 to value 1 of w2 occurs: q1=0, $\overline{q1}$=1, A2=0 and w=1. When w2 goes to 0, only A2 goes to 1, as a result of which w=0, the other selector circuit signals not changing state. The result is steady state conditions under which A2 assumes the values 0 and 1 as w2 assumes the values 1 and 0, w then assuming the values 1 and 0, changing state at a rate set by w2.

3. w1 is recovered after the failure and leads w2.

Figure 6:
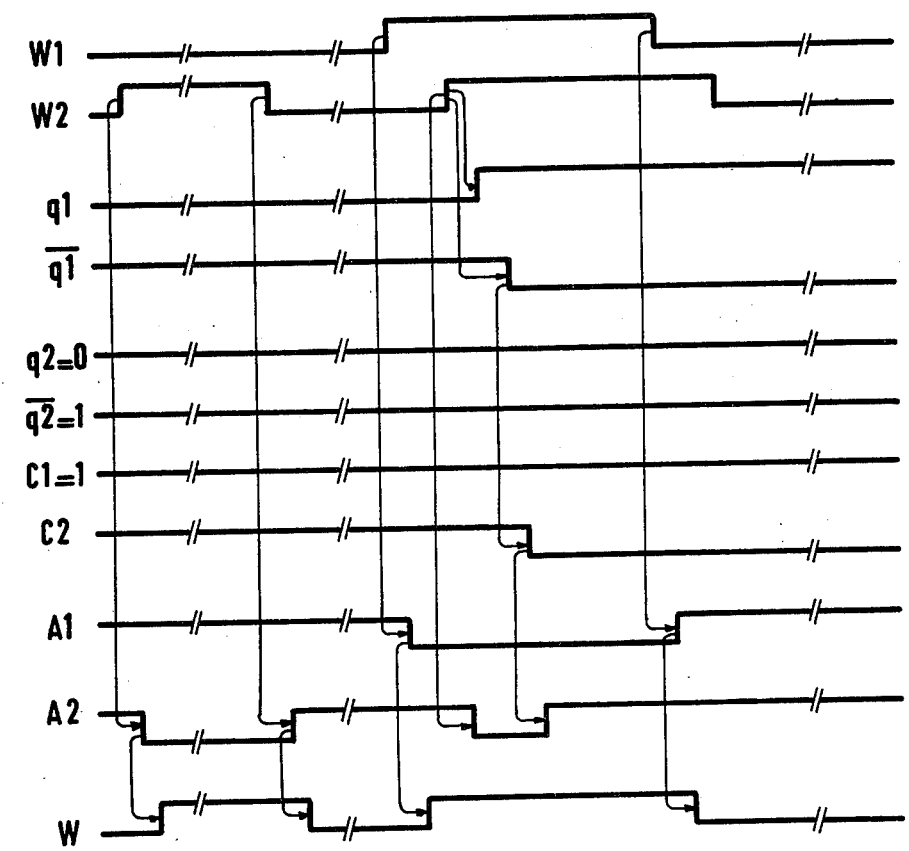

FIG. 6 is a timing diagram showing the various signals in the selector circuit.

When w1 is recovered after the failure and leads w2, the conditions are as stated for the first case, on powering up, and the steady state conditions are the same as for this first case. Clock signal w is immediately resynchronized on w1.

In the three operational cases considered above it was assumed that w1 was leading w2. The case in which w2 leads w1 is readily deduced from an examination of the selector circuit diagram in FIG. 3 and the timing diagrams in FIGS. 4, 5 and 6. In the timing diagrams, by replacing signals w1, w2, q1, $\overline{q1}$, q2, $\overline{q2}$, C1, C2, A1, A2, w with w2, w1, q2, $\overline{q2}$, q1, $\overline{q1}$, C2, C1, A2, A1, w the timing diagrams for the case with w2 leading w1 are obtained.

As each of the two clocks of the duplicated clock has a selector circuit, clock signal w produced by each selector circuit thus corresponds to w1 if w1 is leading w2, to w2 if w2 is leading w1, and to w2 if w1 has failed. The case in which w2 fails when w1 is leading w2 has not been considered, but an examination of the timing diagram in FIG. 4 shows that under steady state conditions signal A2 remains at 1 irrespective of the value of w2. Thus failure of w2 does not alter the steady state conditions. The same would apply if w1 failed with w2 leading w1.

The selector circuits in FIGS. 2 and 3 are shown by way of example only, and it is possible to substitute for the NAND gates or sets of such gates equivalent gates or sets of gates, provided that logic equation (1) defining clock signal w produced by the selector circuit is satisfied.

It is claimed:

1. A device for increasing the operational security of a duplicated clock which comprises identical first and second clocks, each of which includes a majority logic circuit receiving a respective clock signal from each of three timebases the generating a majority clock signal, and a filter and signal shaping circuit receiving said majority clock signal and producing a reconstituted clock signal, said device comprising in each clock a selector circuit which includes identical first and second processing circuits and an output circuit which has a respective input connected to each of said processing circuits, each of which has a respective input connected to the filter and signal shaping circuit of each clock and each of which includes a flip-flop and logic gates, said flip-flop of said first processing circuit having a signal input connected to said filter and signal shaping circuit of said first clock and a clock input connected to said filter and signal shaping circuit of said second clock, and said flip-flop of said second processing circuit having a signal input connected to said filter and signal shaping circuit of said second clock and a clock input connected to said filter and signal shaping circuit of said first clock, and wherein each said selector circuit implements the logic equation:

$$w = (q1 + \overline{q2}) \cdot w1 + (\overline{q1} + q2) \cdot w2$$

in which:
w is a clock signal from the selector circuit,
w1 and w2 are the reconstituted clock signals produced by the first and second clocks, respectively,
q1 and $\overline{q1}$ are the direct and complemented output signals of said flip-flop of said first processing circuit, and
q2 and $\overline{q2}$ are the direct and complemented output signals of said flip-flop of said second processing circuit.

2. A device according to claim 1, wherein:
said flip-flop of said first processing circuit has a direct output connected to an input of a first NAND gate which has another input connected to said filter and signal shaping circuit of said first clock and a complemented output connected to an input of a second NAND gate which has another input connected to said filter and signal shaping circuit of said second clock,
a third NAND gate has an input connected to said first NAND gate and another input connected to said second NAND gate,
said flip-flop of said second processing circuit has a direct output connected to an input of a fourth NAND gate which has another input connected to said filter and signal shaping circuit of said second clock and a complemented output connected to an input of a fifth NAND gate which has another input connected to said filter and signal shaping circuit of said first clock,
a sixth NAND gate has an input connected to said fourth NAND gate and another input connected to said fifth NAND gate, and
said output circuit comprises an OR gate having an input connected to said third NAND gate and another input connected to said sixth NAND gate.

3. A device according to claim 1, wherein:
said first processing circuit comprises a flip-flop and first and second NAND gates,
said second processing circuit comprises a flip-flop and third and fourth NAND gates,
said flip-flop of said first processing circuit has a direct output connected to an input of said third NAND gate and a complemented output connected to an input of said first NAND gate,
said flip-flop of said second processing circuit has a direct output connected to another input of said first NAND gate and a complemented output connected to another input of said third NAND gate,
said second NAND gate has an input connected to said first NAND gate and another input connected to said filter and signal shaping circuit of said first clock,
said fourth NAND gate has an input connected to said third NAND gate and another input connected to said filter and signal shaping circuit of said second clock, and
said output circuit comprises a NAND gate which has an input connected to said second NAND gate and another input connected to said fourth NAND gate.

* * * * *